US008417871B1

(12) United States Patent  
de la Iglesia

(10) Patent No.: US 8,417,871 B1
(45) Date of Patent: Apr. 9, 2013

(54) SYSTEM FOR INCREASING STORAGE MEDIA PERFORMANCE

(75) Inventor: Erik de la Iglesia, San Jose, CA (US)

(73) Assignee: Violin Memory Inc., Mountain View, CA (US)

( * ) Notice: Subject to any disclaimer, the term of this patent is extended or adjusted under 35 U.S.C. 154(b) by 304 days.

(21) Appl. No.: 12/759,604

(22) Filed: Apr. 13, 2010

Related U.S. Application Data

(60) Provisional application No. 61/170,472, filed on Apr. 17, 2009.

(51) Int. Cl.
*G06F 12/16* (2006.01)

(52) U.S. Cl.
USPC .................. 711/5; 711/114; 711/E12.103

(58) Field of Classification Search .................. None
See application file for complete search history.

(56) References Cited

U.S. PATENT DOCUMENTS

| | | | |
|---|---|---|---|
| 5,954,796 A | 9/1999 | McCarty et al. | |
| 6,041,366 A * | 3/2000 | Maddalozzo et al. | 710/5 |
| 6,401,147 B1 | 6/2002 | Sang et al. | |
| 6,636,982 B1 | 10/2003 | Rowlands | |
| 6,678,795 B1 | 1/2004 | Moreno et al. | |
| 6,721,870 B1 | 4/2004 | Yochai et al. | |
| 6,742,084 B1 | 5/2004 | Defouw et al. | |
| 6,789,171 B2 | 9/2004 | Desai et al. | |
| 6,810,470 B1 | 10/2004 | Wiseman et al. | |
| 7,017,084 B2 | 3/2006 | Ng et al. | |
| 7,089,370 B2 | 8/2006 | Luick | |
| 7,100,359 B2 | 9/2006 | Acharya | |
| 7,110,359 B1 | 9/2006 | Acharya | |
| 7,856,533 B2 | 12/2010 | Hur et al. | |
| 7,870,351 B2 | 1/2011 | Resnick | |
| 7,873,619 B1 | 1/2011 | Faibish et al. | |
| 7,975,108 B1 | 7/2011 | Holscher et al. | |
| 8,010,485 B1 | 8/2011 | Chatterjee et al. | |
| 2002/0035655 A1 | 3/2002 | Finn et al. | |
| 2002/0175998 A1 | 11/2002 | Hoang | |
| 2002/0194434 A1 | 12/2002 | Kurasugi | |
| 2003/0012204 A1 | 1/2003 | Czeiger et al. | |
| 2003/0167327 A1 | 9/2003 | Baldwin et al. | |
| 2003/0177168 A1 | 9/2003 | Heitman et al. | |
| 2003/0210248 A1 | 11/2003 | Wyatt | |

(Continued)

OTHER PUBLICATIONS

Mendel Rosenblum and John K. Ousterhout. The LFS Storage Manager. Proceedings of the 1990 Summer Usenix. 1990. pp. 315-324.*

(Continued)

*Primary Examiner* — Edward Dudek, Jr.
*Assistant Examiner* — Ralph A Verderamo, III

(57) ABSTRACT

A storage access system provides consistent memory access times for storage media with inconsistent access latency and reduces bottlenecks caused by the variable time delays during memory write operations. Data is written iteratively into multiple different media devices to prevent write operations from blocking all other memory access operations. The multiple copies of the same data then allow subsequent read operations to avoid the media devices currently servicing the write operations. Write operations can be aggregated together to improve the overall write performance to a storage media. A performance index determines how many media devices store the same data. The number of possible concurrent reads varies according to the number of media devices storing the data. Therefore, the performance index provides different selectable Quality of Service (QoS) for data in the storage media.

21 Claims, 8 Drawing Sheets

U.S. PATENT DOCUMENTS

| | | | |
|---|---|---|---|
| 2004/0128363 A1 | 7/2004 | Yamagami et al. | |
| 2004/0146046 A1 | 7/2004 | Jo et al. | |
| 2004/0186945 A1* | 9/2004 | Jeter et al. | 711/5 |
| 2004/0215923 A1 | 10/2004 | Royer | |
| 2005/0025075 A1 | 2/2005 | Dutt et al. | |
| 2005/0195736 A1 | 9/2005 | Matsuda | |
| 2006/0005074 A1 | 1/2006 | Yanai et al. | |
| 2006/0034302 A1 | 2/2006 | Peterson | |
| 2006/0053263 A1 | 3/2006 | Prahlad et al. | |
| 2006/0075191 A1* | 4/2006 | Lolayekar et al. | 711/114 |
| 2006/0112232 A1 | 5/2006 | Zohar et al. | |
| 2006/0212524 A1 | 9/2006 | Wu et al. | |
| 2006/0218389 A1 | 9/2006 | Li et al. | |
| 2006/0277329 A1 | 12/2006 | Paulson et al. | |
| 2007/0050548 A1 | 3/2007 | Bali et al. | |
| 2007/0079105 A1 | 4/2007 | Thompson | |
| 2007/0118710 A1 | 5/2007 | Yamakawa et al. | |
| 2007/0124407 A1 | 5/2007 | Weber et al. | |
| 2007/0192444 A1 | 8/2007 | Ackaouy et al. | |
| 2007/0233700 A1 | 10/2007 | Tomonaga | |
| 2007/0283086 A1 | 12/2007 | Bates | |
| 2008/0028162 A1 | 1/2008 | Thompson | |
| 2008/0098173 A1 | 4/2008 | Chidambaran et al. | |
| 2008/0104363 A1 | 5/2008 | Raj et al. | |
| 2008/0162864 A1 | 7/2008 | Sugumar et al. | |
| 2008/0215827 A1 | 9/2008 | Pepper | |
| 2008/0215834 A1 | 9/2008 | Dumitru et al. | |
| 2008/0250195 A1 | 10/2008 | Chow et al. | |
| 2008/0320269 A1 | 12/2008 | Houlihan et al. | |
| 2009/0006725 A1 | 1/2009 | Ito et al. | |
| 2009/0006745 A1* | 1/2009 | Cavallo et al. | 711/114 |
| 2009/0034377 A1 | 2/2009 | English et al. | |
| 2009/0110000 A1 | 4/2009 | Brorup | |
| 2009/0240873 A1 | 9/2009 | Yu et al. | |
| 2009/0259800 A1 | 10/2009 | Kilzer et al. | |
| 2009/0262741 A1 | 10/2009 | Jungck et al. | |
| 2009/0276588 A1 | 11/2009 | Murase | |
| 2009/0307388 A1 | 12/2009 | Tchapda | |
| 2010/0011154 A1 | 1/2010 | Yeh | |
| 2010/0030809 A1 | 2/2010 | Nath | |
| 2010/0080237 A1 | 4/2010 | Dai et al. | |
| 2010/0088469 A1 | 4/2010 | Motonaga et al. | |
| 2010/0115206 A1 | 5/2010 | de la Iglesia et al. | |
| 2010/0115211 A1 | 5/2010 | de la Iglesia et al. | |
| 2010/0122020 A1 | 5/2010 | Sikdar et al. | |
| 2010/0125857 A1 | 5/2010 | Dommeti et al. | |
| 2010/0169544 A1 | 7/2010 | Eom et al. | |
| 2010/0174939 A1 | 7/2010 | Vexler | |
| 2011/0047347 A1 | 2/2011 | Li et al. | |
| 2011/0258362 A1* | 10/2011 | McLaren et al. | 711/5 |
| 2012/0198176 A1 | 8/2012 | Hooker et al. | |

OTHER PUBLICATIONS

Stolowitz Ford Cowger Listing of Related Cases, Feb. 7, 2012.
Mark Friedman, Odysseas Pentakalos. Windows 2000 Performance Guide. File Cache Performance and Tuning [reprinted online]. O'Reilly Media. Jan. 2002 [retrieved on Oct. 19, 2012]. Retrieved from the internet: <URL:http://technet.microsoft.com/en-us/library/bb742613.aspx#mainSection>.

* cited by examiner

SYSTEM FOR INCREASING STORAGE MEDIA PERFORMANCE

This application claims priority to application Ser. No. 61/170,472 entitled: STORAGE SYSTEM FOR INCREASING PERFORMANCE OF STORAGE MEDIA, filed Apr. 17, 2009 which is incorporated by reference in its entirety. This application is also related to co-pending application Ser. No. 12/759,644 entitled: SYSTEM FOR INCREASING UTILIZATION OF STORAGE MEDIA, filed on the same day which is also incorporated by reference in its entirety.

BACKGROUND

Flash Solid State Devices (SSD) differ from traditional rotating disk drives in a number of aspects. Flash SSD devices have certain undesirable aspects. In particular, flash SSD devices suffer from poor random write performance that commonly degrades over time. Because flash media has a limited number of write cycles (a physical limitation of the storage material that eventually causes the device to "wear out"), write performance is also unpredictable.

Internally, the flash SSD periodically rebalances the written sections of the media in a process called "wear leveling". This process assures that the storage material is used evenly thus extending the viable life of the device. However, the wear leveling prevents a user of the storage system from anticipating, or definitively knowing, when and for how long such background operations may occur (lack of transparency). Another example of a rebalancing operation is the periodic defragmentation caused by random nature of the user writes over the flash media address space.

For example, the user cannot access data in the flash SSD while these wear leveling or defragmentation operations are being performed and the flash SSD devices do not provide prior notification of when these background operations are going to occur. This prevents applications from anticipating the storage non-availability and scheduling other tasks during the flash SSD rebalancing operations. As a result, the relatively slow and inconsistent write times of the flash devices create bottlenecks for the relatively faster read operations. Vendors typically refer to all background operations as "garbage collection" without specifying the type, duration or frequency of the underlying events.

DETAILED DESCRIPTION

Figure 1:
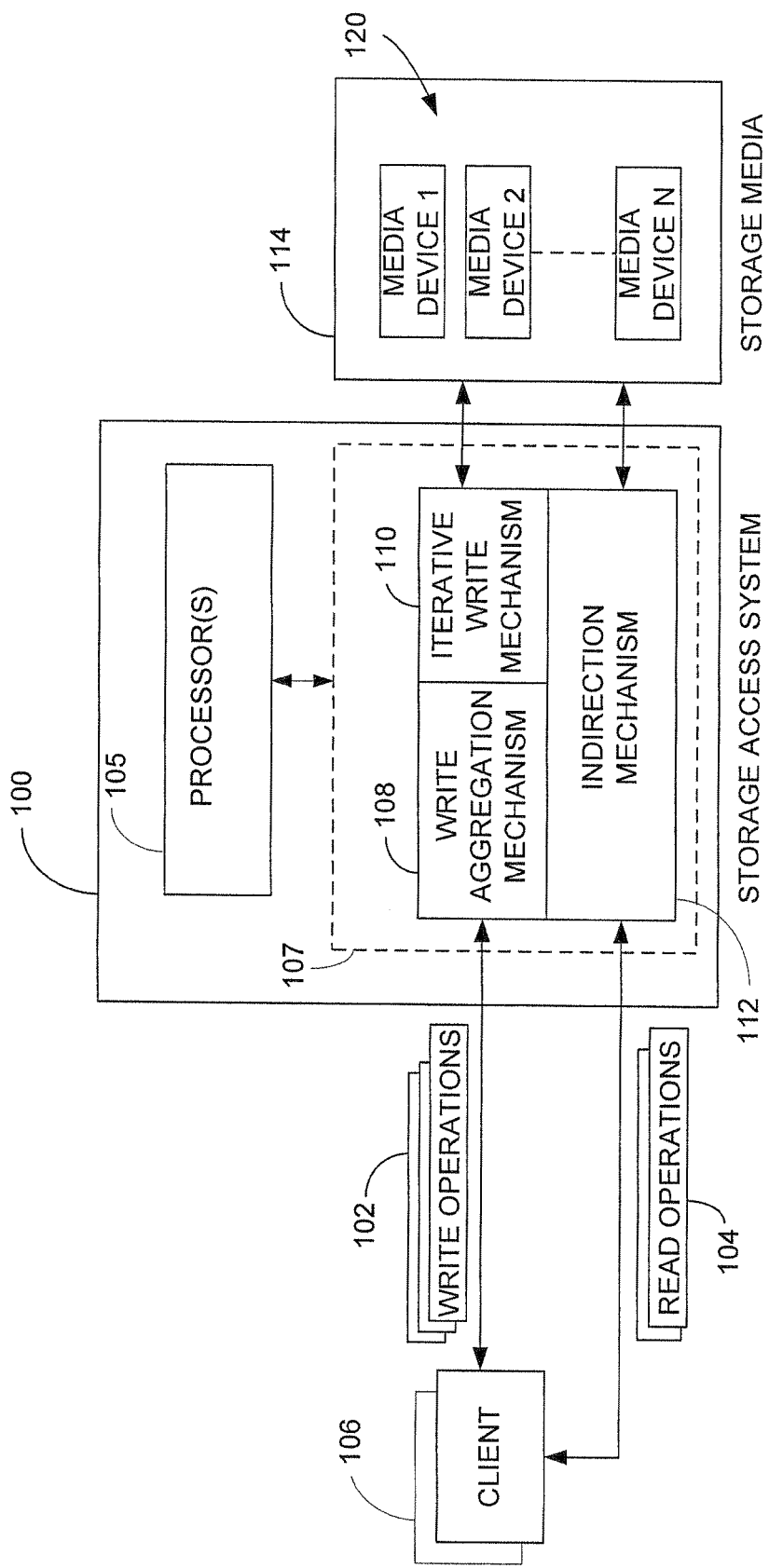
FIG. 1 is a block diagram of a storage access system.

FIG. 1 shows a storage access system 100 that provides more consistent access times for storage media with inconsistent access latency and reduces bottlenecks caused by the slow and variable delays for write operations. Data for client write operations are aggregated to improve the overall performance of write operations to a storage media. The aggregated data is then written iteratively into multiple different media devices to prevent write operations from blocking access to the storage media during read operations. The single aggregated write operation is lower latency than if the client writes had been individually written.

The storage access system 100 includes a write aggregation mechanism 108, iterative write mechanism 110, and an indirection mechanism 112. In one embodiment, the operations performed by the write aggregation mechanism 108, iterative write mechanism 110, and an indirection mechanism 112 are carried out by one or more programmable processors 105 executing software modules located in a memory 107. In other embodiments, some operations in the storage access system 100 may be implemented in hardware and other elements implemented in software.

In one embodiment, a storage media 114 includes multiple different media devices 120 that are each separately read and write accessible by the storage access system 100. In one embodiment, the media devices 120 are flash Solid State Devices (SSDs) but could be or include any other type of storage device that may benefit from the aggregation and/or iterative storage schemes described below.

Clients 106 comprise any application that needs to access data in the storage media 114. For example, clients 106 could comprise software applications in a database system that need to read and write data to and from storage media 114 responsive to communications with users via a Wide Area Network or Local Area Network (not shown). The clients 106 may also consist of a number of actual user applications or a single user application presenting virtual storage to other users indirectly. In another example, the clients 106 could include software applications that present storage to a web application operating on a web server. It should also be understood that the term "clients" simply refers to a software application and/or hardware that uses the storage media 114 or an abstraction of this media by means of a volume manager or other intermediate device.

In one embodiment, the clients 106, storage access system 100, and storage media 114 may all be part of the same appliance that is located on a server computer. In another example, any combination of the clients 106, storage access system 100, and storage media 114 may operate in different computing devices or servers. In other embodiments, the storage access system 100 may be operated in conjunction with a personal computer, work station, portable video or audio device, or some other type of consumer product. Of course these are just examples, and the storage access system 100 can operate in any computing environment and with any application that needs to write and read date to and from storage media 114.

The storage access system 100 receives write operations 102 from the clients 106. The write aggregation mechanism 108 aggregates data for the multiple different write operations 102. For example, the write aggregation mechanism 108 may aggregate four megabytes (MBs) of data from multiple different write operations 102 together into a data block.

The indirection mechanism 112 then uses a performance indexing scheme described below to determine which of the different media devices 120 to store the data in the data block. Physical addresses in the selected media devices 120 are then mapped by the indirection mechanism 112 with the client write addresses in the write operations 102. This mapping is necessary as a specific aggregated write occurs to a single address while the client writes can consist of multiple non-contiguous addresses. Each written client write address can thus be mapped to a physical address which in turn is a subrange of the address of the aggregated write.

The iterative write mechanism 110 iteratively (and serially—or one at a time) writes the aggregated data into each of the different selected media devices 120. This iterative write process only uses one media device at any one time and stores the same data into multiple different media devices 120. Because the same data is located in multiple different media devices 120 and only one media device 120 is written to at any one time, read operations 104 always have access to at least one of the media devices 120 for any data in storage media 114. In other words, the iterative write scheme prevents or reduces the likelihood of write operations creating bottle necks and preventing read operations 104 from accessing the storage media 114. As an example, consider some initial data was written as part of an aggregate write operation over three devices. If at most one of these devices is being written (with future data to other locations) at a time, there will always be at least 2 devices from which the original data can be read without stalling on a pending write operation. A critical property is that this assurance is provided irrespective of the duration of any particular write operation.

A read operation 104 may be received by the storage access system 100 while the iterative write mechanism 110 is iteratively writing data (serially) to multiple different media devices 120. The indirection mechanism 112 reads an address associated with the read operation 104 and then uses an indirection table to determine where the data associated with the read operation is located in a plurality of the media devices 120.

If one of the identified media devices 120 is busy (currently being written to), the indirection mechanism can access the data from a different one of the media devices 120 that also stores the same data. Thus, the read operation 104 can continue while other media devices 120 are concurrently being used for write operations and even other read operations. The access times for read operations are normalized since the variable latencies associated with write operations no longer create bottlenecks for read operations.

Figure 2:
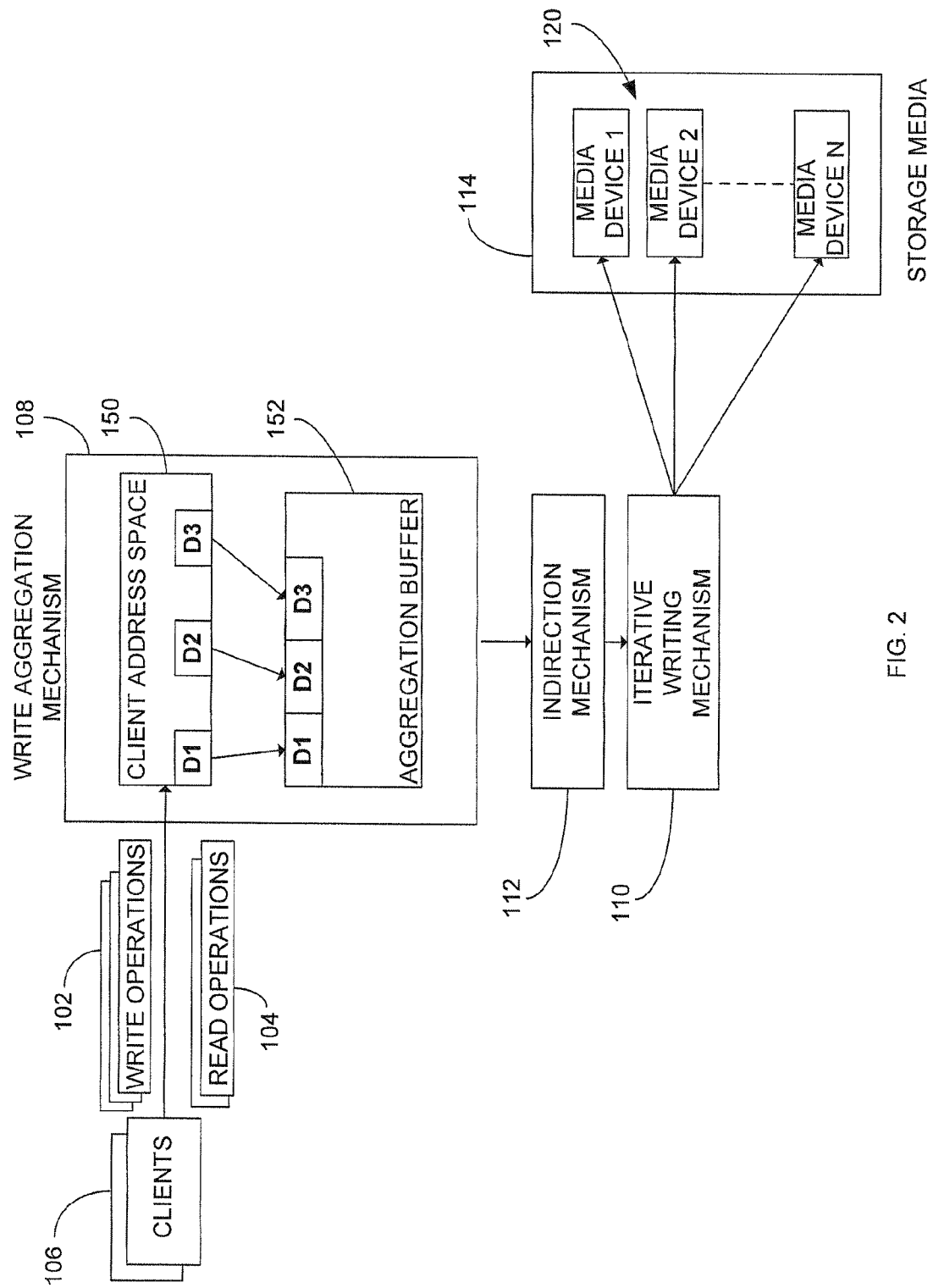
FIG. 2 is a block diagram showing the storage access system of FIG. 1 in more detail.

FIG. 2 describes the operation of the write aggregation mechanism 108 in more detail. The write aggregation mechanism 108 receives multiple different write operations 102 from clients 106. The write operations 102 include client addresses and associated data D1, D2, and D3. The client addresses provided by the clients 106 in the write operations 102 may be random or sequential addresses.

The write aggregation mechanism 108 aggregates the write data D1, D2, and D3 into an aggregation buffer 152. The data for the write operations 102 may be aggregated until a particular amount of data resides in buffer 152. For example, the write aggregation mechanism 108 may aggregate the write data into a 4 Mega Byte (MB) buffer. The indirection mechanism 112 then identifies multiple different media devices 120 within the storage media 114 for storing the data in the 4 MB aggregation buffer 152. In another embodiment, aggregation occurs until either a specific size has been accumulated in buffer 152 or a specified time from the first client write has elapsed, whichever comes first.

At least some examples of how the indirection mechanism 112 aggregates data for random write operations into a single data block and writes the data into media devices 120 is described in co-pending patent application Ser. No. 12/759,644 that claims priority to co-pending application Ser. No. 61/170,472 entitled: STORAGE SYSTEM FOR INCREASING PERFORMANCE OF STORAGE MEDIA, filed Apr. 17, 2009 which are both herein incorporated by reference in their entirety.

Aggregating data for multiple write operations into sequential write operations can reduce the overall latency for each individual write operation. For example, flash SSDs can typically write a sequential set of data faster than random writes of the same amount of data. Therefore, aggregating multiple writes operations into a sequential write block can reduce the overall access time required for completing the write operations to storage media 114.

In another embodiment, the data associated with write operations 102 may not necessarily be aggregated. For example, the write aggregation mechanism 108 may not be used and random individual write operations may be individually written into multiple different media devices 120 without first being aggregated in aggregation buffer 152.

The indirection mechanism 112 maps the addresses for data D1, D2, and D3 to physical addresses in different media devices 120. The data D1, D2, and D3 in the aggregation buffer 152 is then written into the identified media devices 120 in the storage media 114. In subsequent read operations 104, the clients 106 use an indirection table in indirection mechanism 112 to identify the locations in particular media devices 120 where the read data is located.

Figure 3:
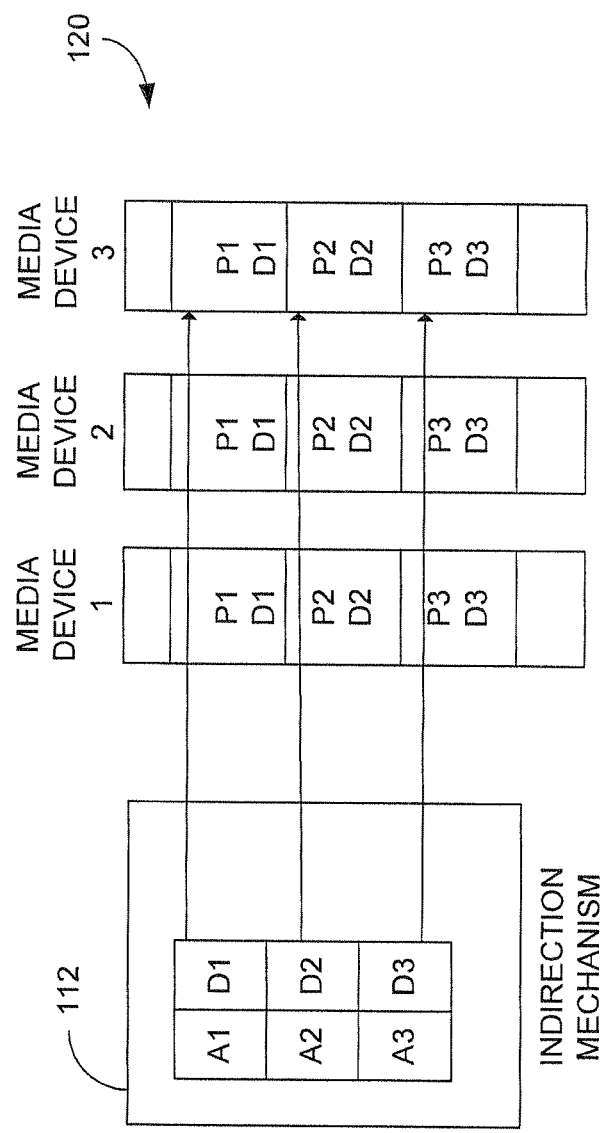
FIG. 3 is a block diagram showing how data is iteratively stored in different media devices.

FIG. 3 shows in more detail one of the iterative write schemes used by the indirection mechanism 112 for writing data into different media devices 120. The indirection mechanism 112 previously received write operations identifying three client addresses A1, A2, and A3 associated with data D1, D2, and D3, respectively.

The iterative writing mechanism 110 writes data D1 for the first address A1 sequentially one-at-a-time into physical address P1 of three media devices 1, 2, and 3. The iterative writing mechanism 110 then sequentially writes the data D2 associated with address A2 sequentially one-at-a-time into physical address P2 of media devices 1, 2, and 3, and then sequentially one-at-a-time writes the data D3 associated with client address A3 sequentially into physical address P3 of media devices 1, 2, and 3. There is now a copy of D1, D2, and D2 in each of the three media devices 1, 2, and 3. In most cases, the writes to media devices 1, 2 and 3 would each have been single writes containing the aggregated data D1, D2 and D3 written at physical address P1 while addresses P2 and P3 are the subsequent sequential addresses. In either case, the result is that the user data for potentially random addresses A1, A2 and A3 are now written sequentially at the same addresses (P1, P2 and P3) on all three devices.

The indirection mechanism 112 can now selectively read data D1, D2, and D3 from any of the three media devices 1, 2, or 3. The indirection mechanism 112 may currently be writing data into one of the media devices 120 and may also receive a read operation for data that is contained in the same media devices. Because the writes are iterative, only one of the media devices 1, 2, or 3 is used at any one time for performing write operations. Since the data for the read operation was previously stored in three different media devices 1, 2, and 3, the indirection mechanism 112 can access one of the other two media devices, not currently being used in a write operation, to concurrently service the read operation. Thus, the write to the storage device 120 does not create any bottlenecks for read operations.

Figure 4:
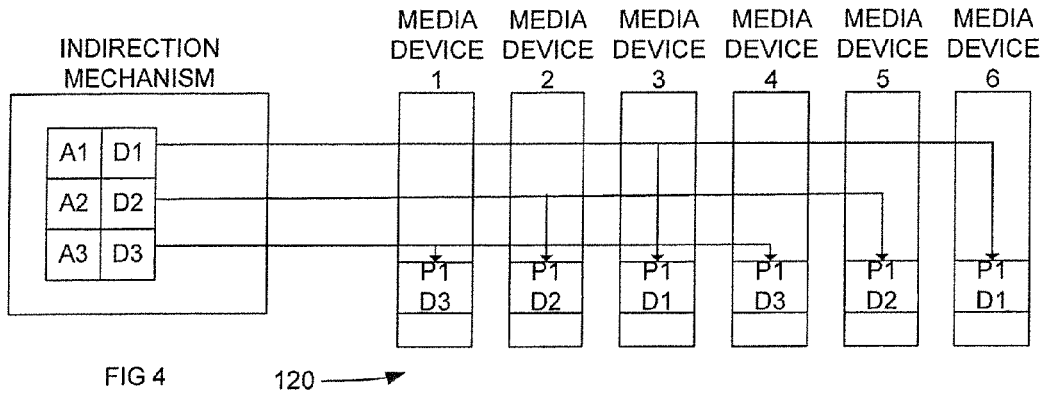
FIGS. 4-6 are block diagrams showing other schemes for iteratively storing data into different media devices.

FIG. 4 shows another write scheme where at least one read operation is guaranteed not to be blocked by any write operations. In this scheme, the iterative write mechanism 110 writes the data D1, D2, and D3 into two different media devices 120. For example, the same data D1 associated with client address A1 is written into physical address P1 in media devices 3 and 6. The same data D2 associated with address A2 is written into physical address P1 in media devices 2 and 5, and the same data D3 associated with address A3 is written into physical address P1 in media devices 3 and 6.

Figure 5:
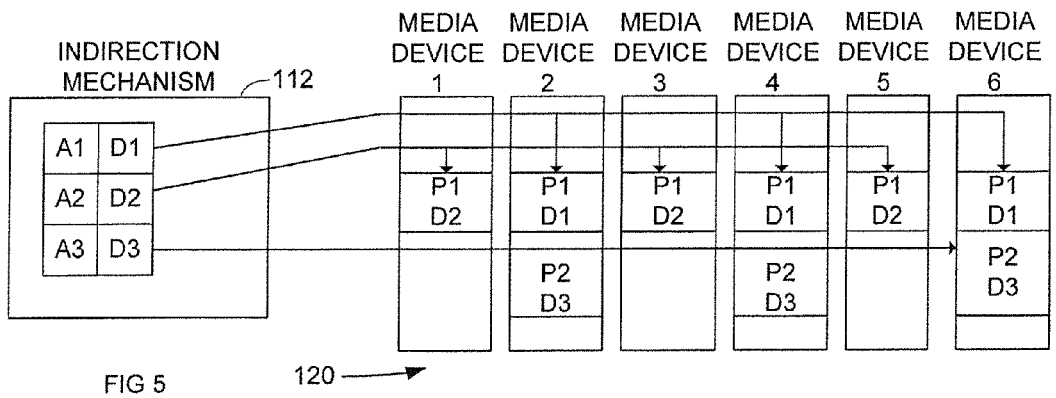

FIG. 5 shows another iterative write scheme where two concurrent reads are guaranteed not to be blocked by the iterative write operations. The iterative write mechanism 110 writes the data D1 associated with address A1 into physical address P1 in media devices 2, 4, and 6. The same data D2 associated with address A2 is written into physical address location P1 in media devices 1, 3, and 5, and the data D3 associated with address A3 is written into physical address location P2 in media devices 2, 4 and 6.

Each block of data D1, D2, and D3 is written into three different media devices 120 and only one of the media devices will be used at any one time for writing data. Three different media devices 120 will have data that can service any read operation. Therefore, the iterative write scheme in FIG. 5 allows a minimum of two read operations to be performed at the same time.

Figure 6:
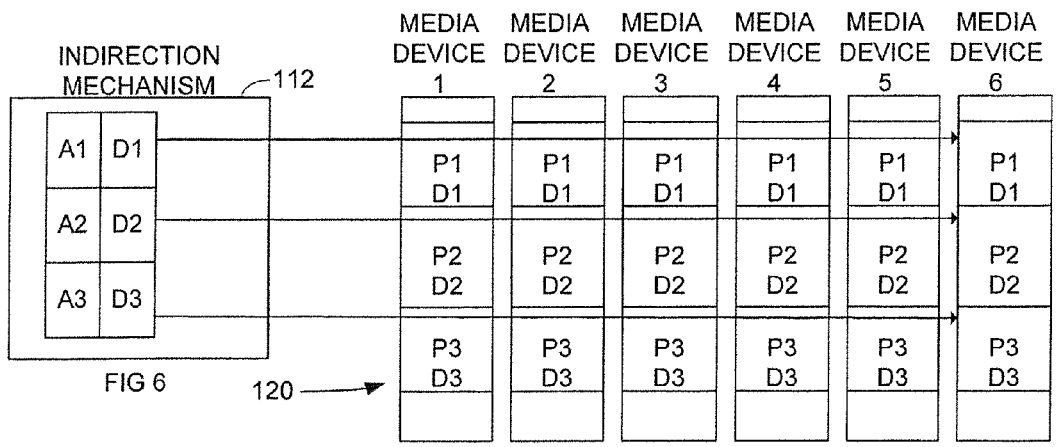

FIG. 6 shows another iterative write scheme that allows a minimum of five concurrent reads without blocking by write operations. The iterative write mechanism 110 writes the data D1 associated with address A1 into physical address locations P1 in all of the six media devices 1-6. The data D2 associated with address A2 is written into physical address locations P2 in all media devices 1-6, and the data D3 associated with address A3 is written into physical address locations P3 in all media devices 1-6.

The same data is written into each of the six media devices 120, and only one of the media devices 120 will be used at any one time for write operations. Therefore, five concurrent reads are possible from the media devices 120 as configured in FIG. 6.

The sequential iterative write schemes described above are different from data mirroring where data is written into different devices at the same time and block all other memory accesses during the mirroring operation. Striping spreads data over different discs, but the data is not duplicated on different memory devices and is therefore not separately accessible from multiple different memory devices. In the present invention, the media devices are written using large sequential blocks of data (the size of the aggregation buffer) such that the random and variable-sized user write stream is converted into a sequential and uniformly-sized media write stream.

Figure 7:
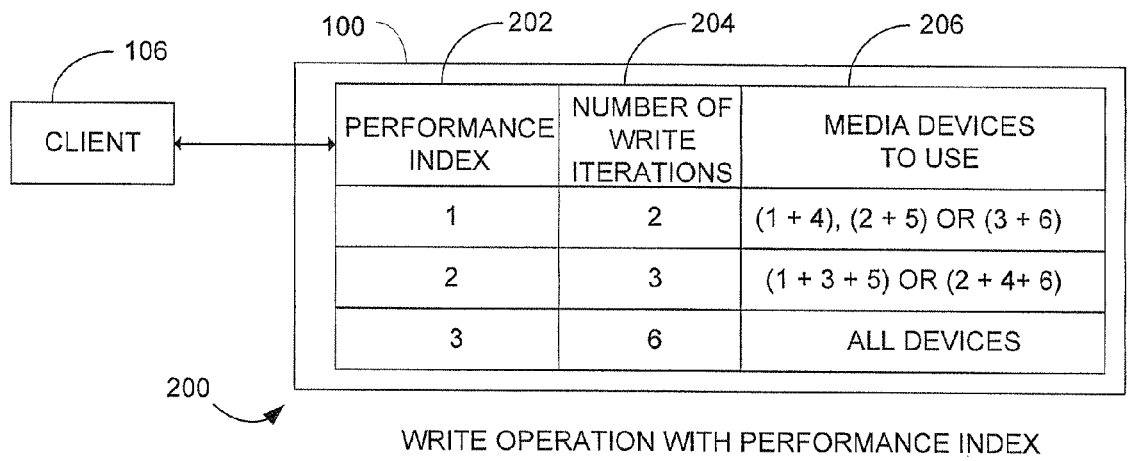
FIG. 7 shows how the storage schemes in FIGS. 4-6 are mapped to different performance indexes.
Figure 8:
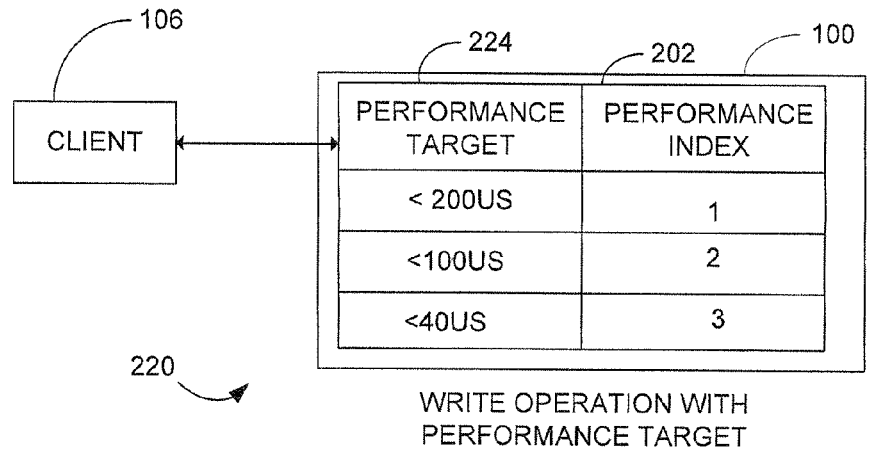
FIG. 8 shows how the storage schemes in FIGS. 4-6 are mapped to different performance targets.

FIGS. 7 and 8 shows how the different write schemes in FIGS. 4-6 can be dynamically selected according to a particular performance index assigned to the write operations. FIG. 7 shows a performance index table 200 that contains different performance indexes 1, 2, and 3 in column 202. The performance indexes 1, 2, and 3 are associated with the write schemes described in FIGS. 4, 5, and 6, respectively.

Performance index 1 has an associated number of 2 write iterations in column 204. This means that the data for each associated write operation will be written into 2 different media devices 120. Column 206 shows which media devices will be written into with the same data. For example, as described above in FIG. 4, media devices 1 and 4 will both be written with the same data D3, media devices 2 and 5 will both be written with the same data D2, and media devices 3 and 6 will both be written with the same data D1.

Performance index 2 in column 202 is associated with three write iterations as indicated in column 204. As described above in FIG. 5, media devices 1, 3 and 5 will all be written with the same data or media devices 2, 4, and 6 will all be written with the same data. Performance index 3 in column 202 is associated with six write iterations as described FIG. 6 with the same data written into all six of the media devices. Selecting performance index 1 allows at least one unblocked read from the storage media. Selecting performance index 2 allows at least two concurrent unblocked reads from the storage media and selecting performance index 3 allows at least five concurrent unblocked reads from the storage media.

A client 106 that needs a highest storage access performance may select performance index 3. For example, a client that needs to read database indexes may need to read a large amount of data all at the same time from many disjoint locations in storage media 114.

A client 106 that needs to maximize storage capacity or that does not need maximum read performance might select performance index 1. For example, the client 106 may only need to read a relatively small amount of data at any one time, or may only need to read blocks of sequential data typically stored in the same media device 120.

The client 106 may know the importance of the data or what type of data is being written. The client accordingly assigns a performance index 1, 2, or 3 to the data by sending a message with a particular performance index to storage access system 100. The indirection mechanism 112 will then start using the particular iterative write scheme associated with the selected performance index. For example, if the storage access system 100 receives a performance index of 2 from the client 106, the indirection mechanism 112 will start writing the same data into three different media devices 120.

Accordingly, when a read operation reads the data back from the storage media 114, the amount of time required to read that particular data will correspond to the selected performance index. For example, since two concurrent reads are provided with performance index 2, data associated with performance index 2 can generally be read back faster than data associated with performance index of 1. Thus, the performance indexes provide a user selectable Quality of Service (QoS) for different data.

FIG. 8 shows another table 220 that associates the performance indexes in table 200 with performance targets 224. The performance targets 224 can be derived from empirical data that measures and averages read access times for each of the different write iteration schemes used by the storage access system 100. Alternatively, the performance targets 224 can be determined by dividing the typical read access time for the media devices 120 by the number of unblocked reads that can be performed at the same time.

For example, a single read access may be around 200 micro-seconds (µs). The performance target for the single unblocked read provided by performance index 1 would therefore be something less than 200 µs. Because two concurrent unblocked reads are provided for performance index 2, the performance target for performance index 2 may be something less than 100 µs. Because five concurrent unblocked reads are provided by performance index 3, the performance target for performance index 3 of something less than 40 µs.

Thus, a client 106 can select a particular performance target 224 and the storage access system 100 will select the particular performance index 202 and iterative write scheme necessary to provide that particular level of read performance. It is also possible, using the described method, to implement a number of media regions with different QoS levels within the same group of physical media devices by allocating or reserving physical address space for each specific QoS level. As physical media space is consumed, it is also possible to reallocate address space to a different QoS level based on current utilization or other metric.

Figure 9:
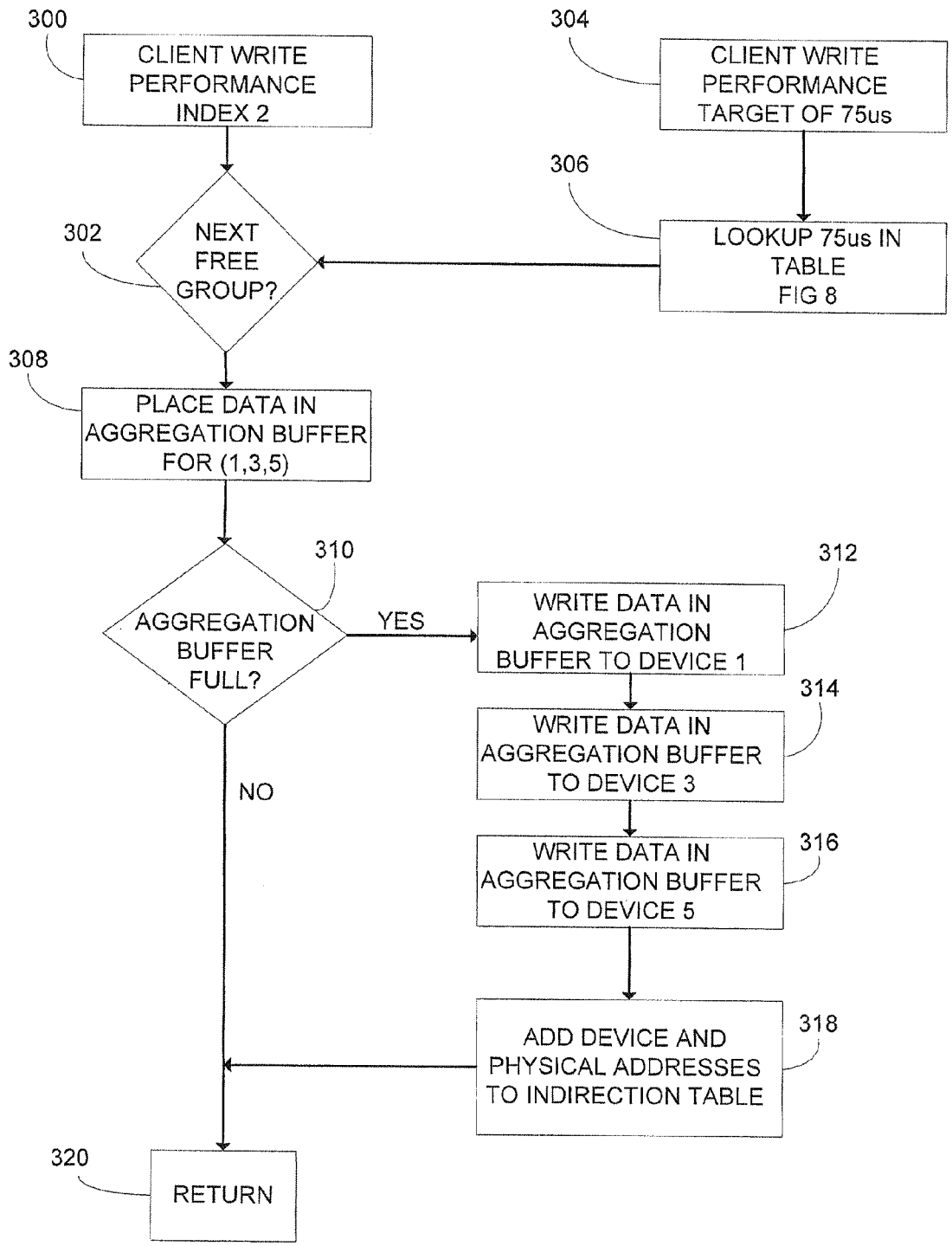
FIG. 9 is a flow diagram showing how iterative write operations are performed by the storage access system in FIG. 1.

FIG. 9 is a flow diagram showing one example of how the storage access system 100 in FIG. 1 performs write operations. In operation 300, the storage access system 100 receives some indication that write data is associated with performance index 2. This could be a message send from the client 106, a preconfigured parameter loaded into the storage access system 100, or the storage access system 100 could determine the performance index based on the particular client or a particular type of identified data. For example, the client 106 could send a message along with the write data or the storage access system 100 could be configured to use performance index 2 based on different programmed criteria such as time of day, client identifier, type of data, etc.

Alternatively a performance target value 224 (FIG. 8) could be identified by the storage access system 100 in operation 304. For example, the client 106 could send a message to the storage access system 100 in operation 304 requesting a performance target of 75 µs. The performance target could also be preconfigured in the storage access system 100 or could be identified dynamically by the storage access system 100 based on programmed criteria. In operation 306 the storage access system 100 uses table 220 in FIG. 8 to identify the performance index associated with the identified performance target of 75 µs. In this example, the system 100 selects performance index 2 since 75 µs is less than the 100 µs value in column 224 of table 220.

In operation 302 the next free media device group is identified. For example, for performance index 2, there are two write groups. The first write group includes media devices 1, 3, and 5, and the second group includes media devices 2, 4, and 6 (see FIGS. 5 and 7). In this example, media device 2, 4, and 6 were the last group of media devices written to by the storage access system 100. Accordingly, the least recently used media device group is identified as media devices 1, 3, and 5 in operation 306.

Write data received from the one or more clients 106 is placed into the aggregation buffer 152 (FIG. 2) in operation 308 until the aggregation buffer is full in operation 310. For example, the aggregation buffer 152 may be 4 MBs. The write aggregation mechanism 108 in FIG. 1 continues to place write data associated with performance index 2 into the aggregation buffer 152 until the aggregation buffer 152 reaches some threshold close to 4 MBs.

The storage access system 100 then writes the aggregated block of write data into the media device as previously described in FIGS. 3-6. In this example, the same data is written into media device 1 in operation 312, media device 3 in a next sequential operation 314 and media device 5 in a third sequential write operation 314. The physical address locations in media devices 1, 3, and 5 used for storing the data are then added to an indirection table in the indirection mechanism 112 in operation 318.

If more write data is received associated with performance index 2, the aggregation buffer 152 is refilled and the next group of media devices 2, 4, and 6 are used in the next iterative write to storage media 114. A different aggregation buffer can be used for other write data associated with other performance indexes. When the other aggregation buffers are filled, the data is iteratively written to the least recently used group of media devices 120 associated with that particular performance index (in this case, the 2, 4, and 6 group).

Figure 10:
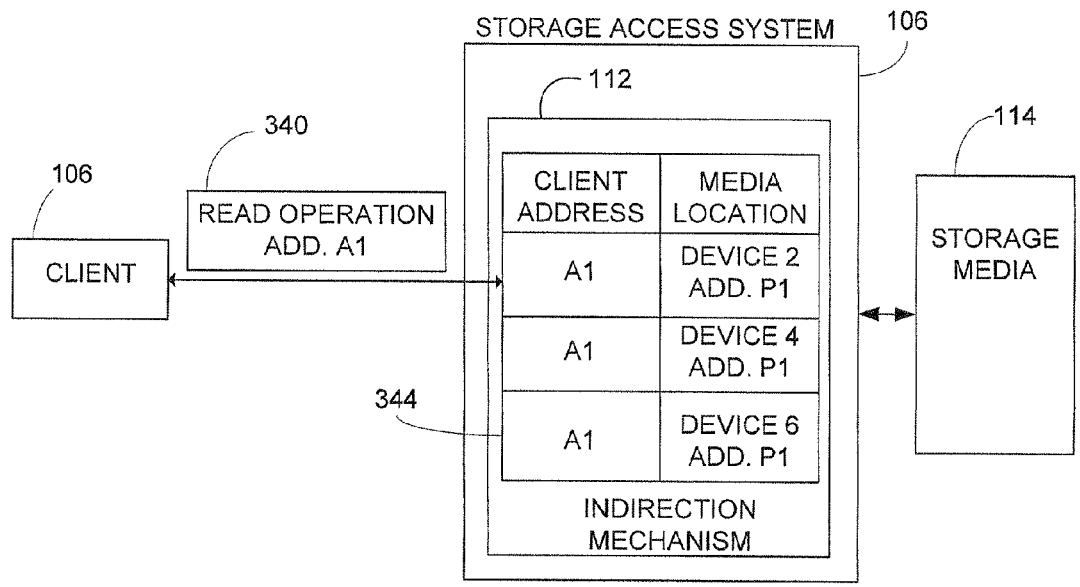
FIGS. 10 and 11 show how the storage access system maps read operations to locations in different media devices.

FIG. 10 shows how a first read operation 340 to address A1 is handled by the storage access system 100. In this example, the iterative write scheme previously shown in FIG. 5 was used to store data into multiple different media devices in storage media 114. Referring quickly back to FIG. 5, the indirection mechanism 112 previously stored the same data D1 sequentially into media devices 2, 4, and 6 at physical address P1. The next data D2 was stored sequentially into media devices 1, 3, and 5 at physical address P2.

Referring again to FIG. 10, indirection table 344 in indirection mechanism 112 maps the address A1 in read operation 340 to a physical address P1 in media devices 2, 4, and 6. It should be noted that as long as the data is stored at the same physical address in each of the media devices, the indirection table 344 only needs to identify one physical address P1 and the associated group number for the media devices 2, 4, and 6 where the data associated with address A1 is stored. This reduces the number of entries in table 344.

The indirection mechanism 112 identifies the physical address associated with the client address A1 and selects one of the three media devices 2, 4, or 6 that is currently not being used. The indirection mechanism 112 reads the data D1 from the selected media device and forwards the data back to the client 106.

Figure 11:
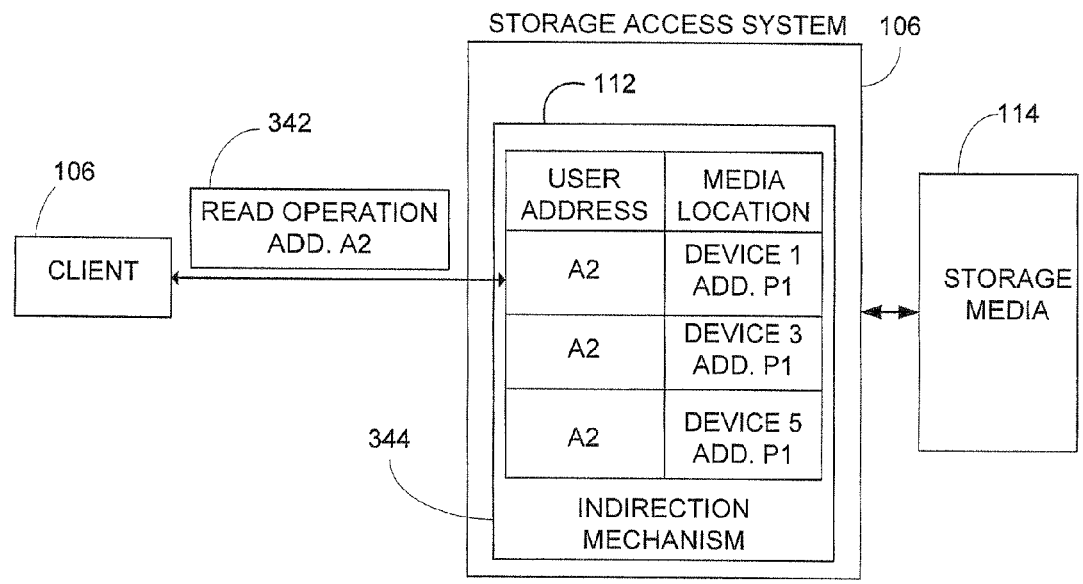

FIG. 11 shows how the storage access system 100 handles a read operation 342 to address A2. Recall that in FIG. 5, the data D2 associated with address A2 was previously stored in physical address P1 of media devices 1, 3, and 5. Accordingly, the indirection mechanism 112 mapped address A1 to physical address P1 in media devices 1, 3, and 5.

Responsive to the read operation 342, the indirection mechanism 112 identifies the physical address P1 associated with the read address A2 and selects one of the three media devices 1, 3, or 5 that is currently not being used. The indirection mechanism 112 reads the data D2 from the selected one of media devices 1, 3, or 5 and forwards the data D2 back to the client 106.

Figure 12:
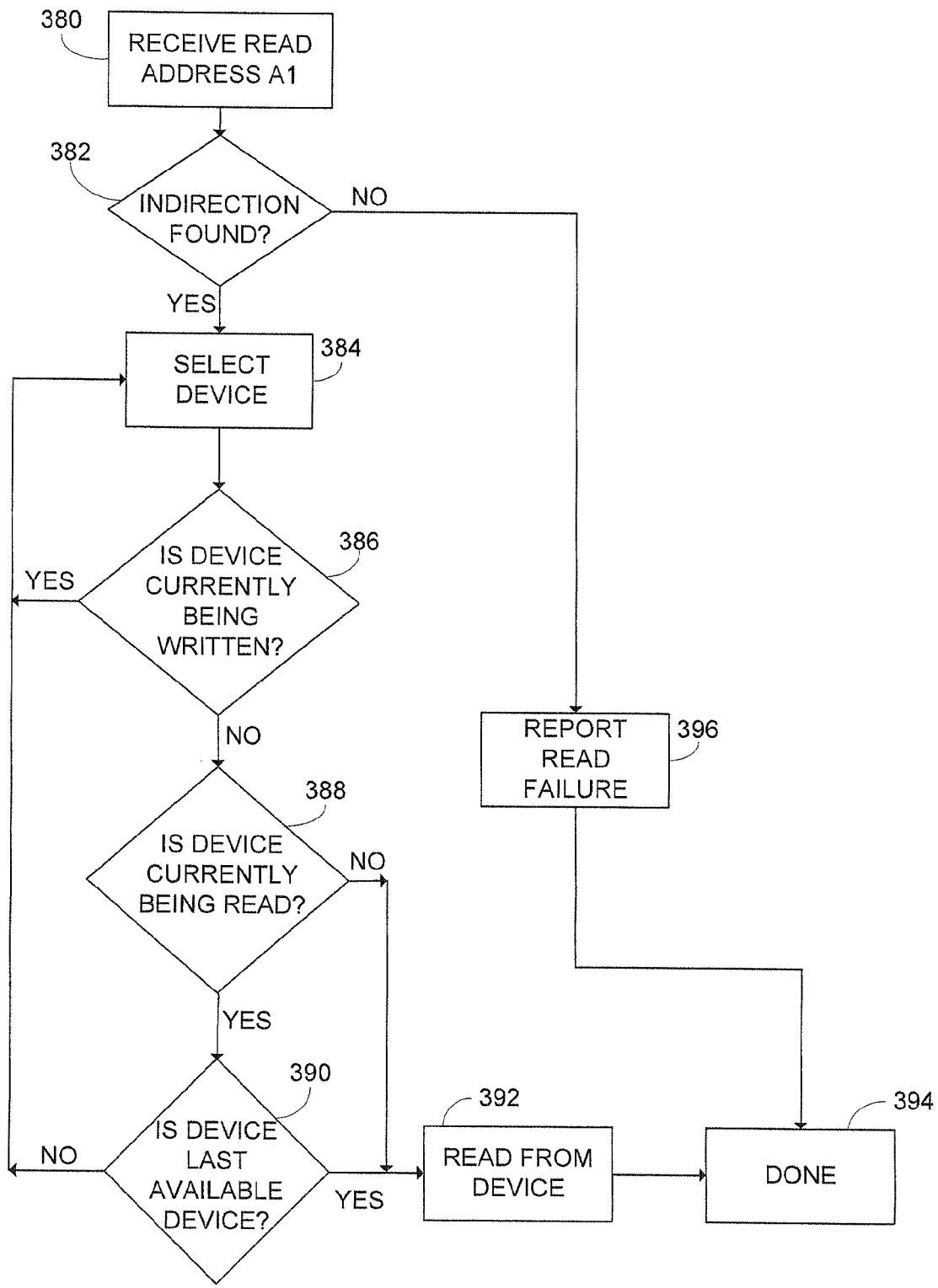
FIG. 12 is a flow diagram showing how the storage access system selects one of the media devices for a read operation.

FIG. 12 is a flow diagram describing in more detail how the indirection mechanism 112 determines what data to read from which of the media devices 120 in the storage media 114. In this example, data D1 has been previously written into the storage media 114 as described above in FIG. 5 and the indirection table 344 in FIG. 10 has been updated by the indirection mechanism 114.

In operation 380, the indirection mechanism receives a read operation for address A1 from one of the clients 106 (FIG. 1). If the indirection table 344 does not include an entry for address A1 in operation 382, a read failure is reported in operation 396 and the read request is completed in operation 394.

In this example, three candidate media addresses on media devices 2, 4, and 6 are identified by the indirection mechanism in operation 382. The indirection mechanism 112 selects one of the identified media devices in operation 384. If the selected media device is currently being used in a write operation in operation 386, the next one of the three identified media devices is selected in operation 384.

If the selected media device is currently being used in a read operation in operation 388, the indirection mechanism 112 selects the next media device from the group in operation 384. This process is repeated until a free media device is identified or the last media device in indirection table 344 of FIG. 10 is identified in operation 390. The data D1 in the available media device 2, 4, or 6 is read by the indirection mechanism and returned to the client 106 in operation 392.

Of course, the read and write status of all three media devices 2, 4, and 6 can be determined by the indirection mechanism 112 at the same time by monitoring the individual read and write lines for all of the media devices. The indirection mechanism 112 could then simultaneously eliminate the unavailable media devices and then choose the least recently used one of the remaining available media devices. For example, media device 4 may currently be in use and media devices 2 and 6 may currently be available. The redirection mechanism 112 reads the data D1 at physical address location P1 from the least recently used one of media devices 2 and 6 in operation 392.

As previously mentioned, any combination of performance indexes and number of media devices can be used for storing different data. For example, the client 106 (FIG. 1) may select performance index 1 for a first group of data and select performance index 3 for more performance critical second group of data. As long as the associated performance index is known, the indirection mechanism 112 can write the data to the necessary number of media devices per indirection tables 200 and 220 in FIGS. 7 and 8. The indirection mechanism 112 uses the indirection table 344 in FIGS. 10 and 11 to map the client addresses to particular physical addresses in the identified group of media devices 120. The different performance levels for the different performance indexed data is then automatically provided since the number of possible concurrent reads for particular data corresponds directly with the number of media devices storing that particular data.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. Any modifications and variation coming within the spirit and scope of the present invention are also claimed.

The invention claimed is:

1. A system, comprising:
multiple media devices; and
a processor configured to:
receive data for write operations;
identify a group of three or more of the media devices for writing the data;
sequentially write the data into each of the three or more media devices in the identified group;
receive two or more read operations;
identify one of the media devices currently being written with the data; and
concurrently read data from address locations associated with the two or more read operations from two or more of the media devices in the group not currently being written with the data.

2. The system according to claim 1 wherein:
the media devices have variable write latencies; and
the processor is further configured to normalize read latencies for the media devices by concurrently reading the data from multiple ones of the media devices in the group that are not being used for writing data.

3. The system according to claim 1 wherein the media devices comprise flash solid state devices.

4. The system according to claim 1 wherein the processor is further configured to:
aggregate together a first set of the data for a first set of the write operations;
identify a first performance index associated with the first set of the data;
write the aggregated first set of data into sequential physical address locations so a first number of the media devices in the group of media devices associated with the first performance index can be read without being blocked by the writing of the aggregated first set of data;
aggregate together a second set of the data for a second set of the write operations;
identify a second performance index associated with the second set of the data; and
write the aggregated second set of data into sequential physical address locations so a second number of the media devices in an additional group of the media devices associated with the second performance index can be read without being blocked by the writing of the aggregated second set of data.

5. The system according to claim 4 wherein a size of the aggregated first and second set of data is variable and based on when the write operations are identified.

6. The system according to claim 1 wherein the processor is configured to:
identify a performance index for the write operations; and
identify a number of two or more of the media devices in the group for providing concurrent read operations based on the performance index.

7. The system according to claim 6 wherein the processor is further configured to write the data into one additional media device in addition to the identified number of the two or more media devices for providing concurrent read operations.

8. The system according to claim 6 wherein the processor is configured to identify a performance target for the particular write operation and map the performance target to the performance index.

9. The system according to claim 8 wherein the performance target corresponds with a read access time of the media devices.

10. The system according to claim 8 wherein the performance target corresponds with how many of the media devices are in the group.

11. The system according to claim 1 further comprising a memory storing an indirection table that maps write addresses used in the write operations to separate independently accessible locations in each one of the media devices in the identified group.

12. The system of claim 1 wherein the processor is configured to use a same physical address to store the data in each of the media devices.

13. An apparatus, comprising:
storage elements; and
a storage access system configured to:
perform write operations configured to write same data into the storage elements sequentially one at a time so a number of the storage elements remain available for read operations while the other storage elements are being written with the data, wherein the number of storage elements available for the read operations is associated with a selectable performance index;
map read addresses for the read operations to multiple different ones of the storage elements not currently being used for the write operations; and concurrently read data during the read operations from the number of the storage elements associated with the performance index and not currently being used by the write operations.

14. The apparatus according to claim 13 wherein the storage elements comprise flash solid state devices.

15. The apparatus according to claim 13 wherein:
the storage elements are independently read and write accessible;
the storage access system is configured to iteratively write a same independently accessible copy of the same data into each of the multiple different storage elements to avoid blocking access of the read operations to the number of the storage elements associated with the performance index during the write operations.

16. The apparatus according to claim 13 wherein the storage access system normalizes read access times for variable latency storage elements by writing the data to three or more different storage elements and then reading back the data from two or more of the storage elements that are not currently being used for the write operations.

17. The apparatus according to claim 13 wherein the storage access system is further configured to:
aggregate together a first set of the data for a first set of the write operations;
write the first set of the data into sequential physical address locations for each one of a first group of the storage elements, wherein the storage access system is configured to perform concurrent read operations from the first group of storage elements not currently being written with the first set of data;
aggregate together a second set of the data for a second set of the write operations; and
write the second set of the data into sequential physical address locations for each of a second group of the storage elements different from the group of storage elements, wherein the storage access system is configured to perform concurrent read operations from the second group of storage elements not currently being written with the second set of data.

18. The apparatus according to claim 13 further comprising an indirection table configured to map the read addresses to physical addresses in the storage elements.

19. The apparatus according to claim 13 wherein the performance index maps to different numbers of groups of the storage elements and different numbers of storage elements within groups.

20. A method, comprising:
receiving data for write operations;
aggregating together a set of the data for a set of the write operations;
identifying a performance index for the set of the data;
performing sequential write operations for the aggregated set of the data into sequential physical address locations for each one of a group of media devices so a number of the media devices can be accessed by read operations during the sequential write operations, wherein the number of the media devices that can be accessed by the read operations during the write operations is based on the performance index.

21. The method of claim 20, further comprising:
aggregating together an additional set of the data for an additional set of the write operations;
identifying an additional performance index for the additional set of the data;
performing additional sequential write operations for the aggregated additional set of the data into sequential physical address locations for each one of an additional group of media devices so a number of the media devices can be accessed by additional read operations during the additional sequential write operations, wherein the number of the media devices that can be accessed by the additional read operations during the additional sequential write operations is based on the additional performance index.

* * * * *